United States Patent [19]

Jurgens et al.

[11] 3,889,798
[45] June 17, 1975

[54] DEVICE FOR TRANSPORTING BARS

[75] Inventors: Heinz Jurgens, Unna; Heinrich Ostendorf, Dortmund, both of Germany

[73] Assignee: Brown, Boveri & Cie AG, Mannheim, Germany

[22] Filed: Jan. 15, 1974

[21] Appl. No.: 433,521

[30] Foreign Application Priority Data
Jan. 16, 1973  Germany............................. 2301929

[52] U.S. Cl.................. 198/127; 198/167; 226/181
[51] Int. Cl............................................ B41j 13/00
[58] Field of Search....... 198/127, 137, 167, 1, 160; 226/181

[56] References Cited
UNITED STATES PATENTS
| | | | |
|---|---|---|---|
| 1,096,857 | 5/1914 | Pederquist | 198/127 R |
| 2,167,049 | 7/1939 | Maurath et al. | 198/127 R |
| 3,610,391 | 10/1971 | Beck | 198/167 X |

Primary Examiner—Evon C. Blunk
Assistant Examiner—James M. Slattery
Attorney, Agent, or Firm—Herbert L. Lerner

[57] ABSTRACT

Driven members for transporting heavy bars or bar sections on slideways, in their longitudinal direction, comprising drive wheels for the bars. Driven wheels are arranged alongside and act on the bars, the wheels having radial circular slots at their periphery. Lateral guide bars are mounted in the slots to keep the transported bars from tilting.

1 Claim, 4 Drawing Figures

DEVICE FOR TRANSPORTING BARS

The invention concerns means for the transporting of bars or bar sections, which are moved on slideways, placed one behind the other, in their longitudinal direction by means of a feed mechanism.

Transport arrangements are known, in which the material in bar form is moved along by enclosing drive mechanisms which can be pressed against the two vertical lateral surfaces of the former, for instance, by endless chains revolving over driven gears, on practically level tracks.

These arrangements are very expensive to build because of the large number of individual parts required. The wear is furthermore very great if the enclosing drive gear consists of metal.

It is an object of the invention to provide means for transporting bars or bar sections, in which the latter are moved along by friction force and are at the same time also guided.

According to the invention, the solution to this problem is to provide as the drive means for the bars or bar sections, friction wheels which are arranged alongside the former and act on them, and which have radial circular slots at their periphery which include lateral guide bars, to prevent the transported bars from tilting.

If bars or bar sections which have large cross-section and large weight are to be moved longitudinally, at least one friction wheel and one guide bar is arranged on each side alongside the bars or the bar sections, according to the invention, in order to obtain reliable, straight guidance.

In the case of bars or bar sections with small cross-section, which are lighter in weight, however, it is also sufficient if, according to the invention, a guide bar and at least one friction wheel are arranged on one side alongside the bars or the bar sections, and on the other side are arranged a guide bar and at least one guide wheel without drive.

In order that the bars or bar sections can be supplied to a machine tool with the optimum velocity by a multiplicity of feeding devices, the friction wheels, if several of them are used, are synchronously driven with variable speed adjustments.

If in a transporting arrangement, more feed mechanisms are available than are necessary for moving the bars or the bar sections, some of these can be used as freely rotating guide members, which have practically no sliding friction, since according to the invention, the friction wheels can be disengaged from their drive units.

In order that on the one hand, the friction contact required for the transmission of the forces is available in the feed mechanisms, the magnitude of which depends on the weight of the material to be transported, and on the other hand, the revolving support members do not come to a standstill by too little contact pressure and thereby lose their ability to guide, the friction wheels and guide wheels can be pressed against the bars or bar sections with adjustable pressure.

In order to make it possible to transmit the driving forces coming from the feed drives and the holding forces, which may oppose the former and stem from the rotating support members without slippage to the bar material, which in most cases is not yet machined and is also not always quite straight, the periphery of the friction and guide wheels consists, according to the invention, of elastic material.

In order to increase the force-transmitting contact area of the feed mechanisms or rotating support members, which are in touch with the bars or bar sections, the periphery of the friction and guide wheels are fitted to the shape of the cross-section bars or bar sections, according to the invention.

As with decreasing diameter of the feed mechanisms and the rotating support members the wear at their periphery increases greatly, it is further recommended, according to the invention, that the diameter of the friction and guide wheels is made at least twice that of the bars or the bar sections.

Other features which are considered as characteristic for the invention are set forth in the appended claims.

Although the invention is illustrated and described herein as embodied in a particular embodiment, it is nevertheless not intended to be limited to the details shown, since various modifications may be made therein without departing from the spirit of the invention and within the scope and range of equivalents of the claims.

The method of the invention, however, together with additional objects and advantages thereof will be best understood from the following description when read in connection with the accompanying drawings, in which.

Figure 2:
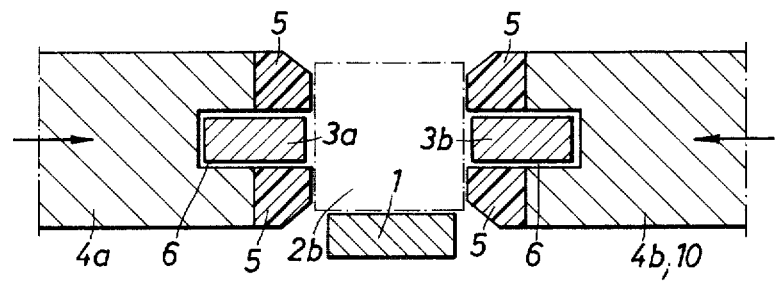
FIG. 2, is a cross-section view along the line A–B of FIG. 1.
Figure 1:
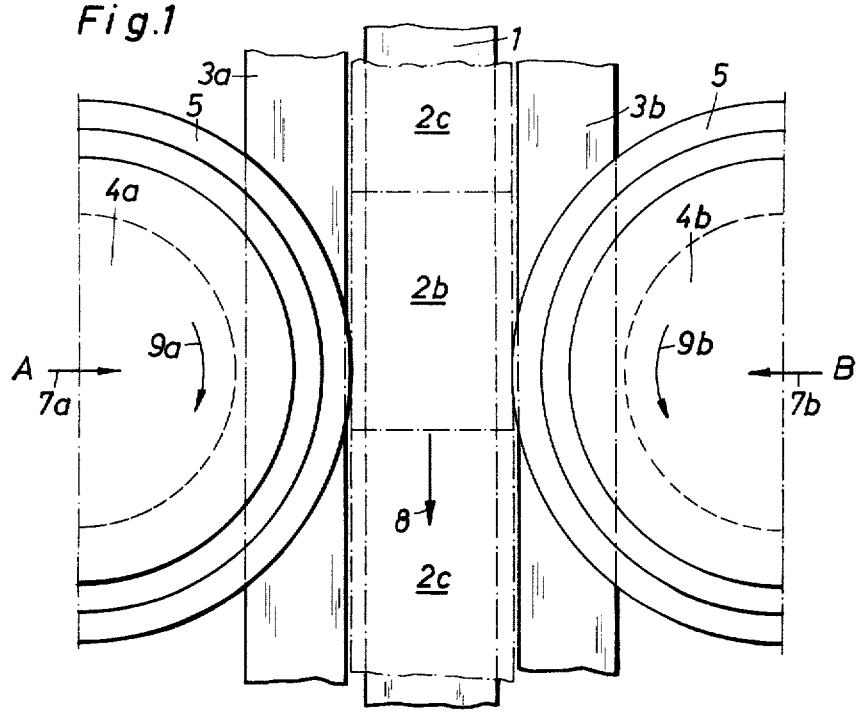
FIG. 1, is a top view of a transporting arrangement.

In FIGS. 1 and 2, a number of bar sections $2a$ to $2c$ of square cross-section also called blocks, lie on the slideways 1, arranged one behind the other. At one-half the height of the bar sections stationary lateral guide bars $3a$ and $3b$ are arranged at a small distance from the former. Between these a number of bar sections move on the slideways from the loading point to the machine tool.

The bar sections are moved forward by the bar section $2b$, which is at the moment grasped with friction contact by the two friction wheels $4a$, $4b$ and is taken along by the friction wheels as they rotate, and pushes the bar section $2a$ preceding it ahead.

The friction wheels $4a$, $4b$, have coverings which consist of an elastic material 5. This prevents slippage between the friction wheels and the bar section gripped by them. Due to the elastic material, damage to the friction wheels which would otherwise be caused at the not yet machined, rough surfaces of the bar sections, is minimized.

Due to the lateral guide bars $3a$, $3b$, which are situated in the area of the radial, circular slots 6 of the friction wheels $4a$, $4b$, troublefree straight guidance of the bar section $2b$ is assured even if the contact pressure by one of the two friction wheels is too low, and tilting of this bar section is impossible.

The arrows $7a$, $7b$ indicate that the friction wheels $4a$, $4b$, are pressed for instance, by adjustable springs against the bar section $2b$ with sufficient pressure as required to move the bar section $2a$ ahead forward in the direction of the arrow 8.

The friction wheels $4a$, $4b$, are connected to drive wheel units $9a$, $9b$ as shown by curved arrows which run synchronously with each other and whose speed can be controlled in conventional manner in accordance with the desired transport speed of the bar section.

The drive units 9a, 9b can be disengaged from the friction wheels 4a, 4b. Therefore, the driving force can be removed from one of the two friction wheels, for instance, from the right-hand wheel 4b in FIG. 1, if the latter is not necessary to move the material. This wheel then serves as a freely rotatable guide wheel 10 for roller-guiding the bar section 2b, which then must not be pressed by the friction wheel 4a on the left against the lateral guide bar 3b on the right. Force-consuming sliding friction between the latter and the bar section 2b is thereby avoided.

Figure 3A:
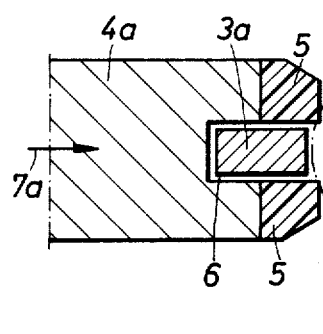
FIGS. 3A and 3B are sectional views of a modification of the invention.

In FIG. 3A, in which the same parts are provided with the same reference symbols as in FIGS. 1 and 2, the elastic material 5 at the periphery of the friction wheel 4a has the same cross-section shape as in FIG. 2, with which a square bar section 2b is to be moved. When transporting a round bar 11 in accordance with FIG. 3A by the friction wheel, this leads to considerably faster wear of the same, due to the higher contact pressure with a smaller contact area of the elastic material.

Figure 3B:
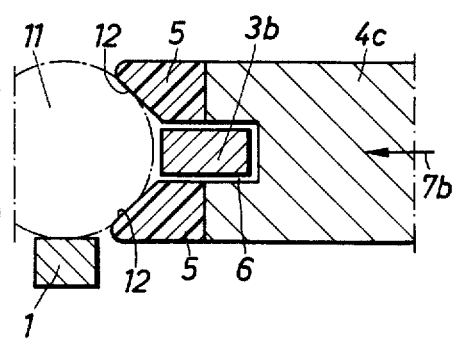

It is therefore advantageous to fit the peripheral surface 12 of the elastic material 5 of the friction wheel 4c to the external shape of the round bar 11 to be transported, as shown in FIG. 3B.

It is, of course, possible to provide in the direction of travel of the bars or bar sections alongside the latter a multiplicity of friction or guide wheels on both sides in any desired configuration, and also to make the friction wheels so that they can be driven forward and backward.

The advantages achieved with the invention are particularly that by arranging lateral guide bars inside the slots of the friction or guide wheels, the bars or bar sections can no longer get tilted or jammed in their travel on the slideways in the area of the feeding mechanism.

We claim:

1. Means for transporting bars or bar sections, on slideways, in their longitudinal direction comprising driven friction wheels which are arranged alongside and acting on said bars, said wheels having radial circular slots at their periphery, and means to compensate for uneven pressure of said wheels on said bars and prevent the bars from tilting, comprising lateral guide bars mounted in said slots, said guide bars being located to bear on central portions of said bars, at least one friction wheel and guide bar being located on each side alongside the bars to be transported, the surfaces of the friction wheels extending slightly beyond the surfaces of the guide bars above and below the guide bars.

* * * * *